United States Patent
Ando (10) Patent No.: US 9,699,348 B2
(45) Date of Patent: Jul. 4, 2017

(54) DATA STORAGE SYSTEM, IMAGE PROCESSING DEVICE, PORTABLE TERMINAL, AND NON-TRANSITORY COMPUTER READABLE MEDIUM FOR STORING DATA OBTAINED BY THE IMAGE PROCESSING DEVICE

(71) Applicant: FUJI XEROX CO., LTD., Tokyo (JP)

(72) Inventor: Yoshinori Ando, Yokohama (JP)

(73) Assignee: FUJI XEROX CO., LTD., Tokyo (JP)

(*) Notice: Subject to any disclaimer, the term of this patent is extended or adjusted under 35 U.S.C. 154(b) by 0 days.

(21) Appl. No.: 14/529,919

(22) Filed: Oct. 31, 2014

(65) Prior Publication Data

US 2015/0222784 A1    Aug. 6, 2015

(30) Foreign Application Priority Data

Feb. 4, 2014    (JP) .................... 2014-019716

(51) Int. Cl.
| | |
|---|---|
| G06F 3/12 | (2006.01) |
| H04N 1/32 | (2006.01) |
| H04N 1/00 | (2006.01) |
| H04N 1/21 | (2006.01) |

(52) U.S. Cl.
CPC ..... *H04N 1/32422* (2013.01); *H04N 1/00214* (2013.01); *H04N 1/00244* (2013.01); *H04N 1/00307* (2013.01); *H04N 1/21* (2013.01); *H04N 1/32379* (2013.01); *H04N 2201/218* (2013.01)

(58) Field of Classification Search
CPC combination set(s) only.
See application file for complete search history.

(56) References Cited

U.S. PATENT DOCUMENTS

| | | | |
|---|---|---|---|
| 2003/0142345 A1* | 7/2003 | Bunn | G06F 3/1204 358/1.15 |
| 2004/0093598 A1 | 5/2004 | Haga et al. | |
| 2008/0024809 A1 | 1/2008 | Brownstein | |

(Continued)

FOREIGN PATENT DOCUMENTS

| | | |
|---|---|---|
| JP | 2006270612 A | 10/2006 |
| JP | 2008225862 A | 9/2008 |

(Continued)

OTHER PUBLICATIONS

Office Action issued Aug. 19, 2014, by the JPO in related Japanese Application No. 2014-019716.

(Continued)

*Primary Examiner* — Henok A Shiferaw
(74) *Attorney, Agent, or Firm* — Sughrue Mion, PLLC (57) ABSTRACT

An image processing device includes storage unit, a communication portion and an image processing function control portion. The storage unit stores image data. The communication portion performs communication with a server and a portable terminal. The image processing function control portion causes the communication portion to transmit the image data stored in the storage unit to the server and causes the communication portion to transmit the image data to the portable terminal in response to failure of the transmission of the image data to the server by the communication portion.

13 Claims, 9 Drawing Sheets

(56) References Cited

U.S. PATENT DOCUMENTS

| | | | |
|---|---|---|---|
| 2008/0212124 A1* | 9/2008 | Hirama | H04N 1/00225 358/1.14 |
| 2009/0164999 A1* | 6/2009 | Tsuboi | H04N 1/00307 718/101 |
| 2011/0279870 A1 | 11/2011 | Ejiri | |
| 2012/0120448 A1* | 5/2012 | Komaba | H04N 1/00222 358/1.15 |
| 2012/0275647 A1 | 11/2012 | Gabe | |
| 2013/0086638 A1* | 4/2013 | Itogawa | G06F 21/34 726/4 |
| 2013/0159536 A1* | 6/2013 | Kawabata | H04L 65/1069 709/227 |

FOREIGN PATENT DOCUMENTS

| | | |
|---|---|---|
| JP | 2008294890 A | 12/2008 |
| JP | 2010034767 A | 2/2010 |
| JP | 2012053550 A1 | 3/2012 |
| WO | 2013175679 A1 | 11/2013 |

OTHER PUBLICATIONS

Office Action dated Jul. 22, 2015 issued by the Australian Government IP Australia in counterpart Australian Patent Application No. 2014256393.

\* cited by examiner

DATA STORAGE SYSTEM, IMAGE PROCESSING DEVICE, PORTABLE TERMINAL, AND NON-TRANSITORY COMPUTER READABLE MEDIUM FOR STORING DATA OBTAINED BY THE IMAGE PROCESSING DEVICE

CROSS-REFERENCE TO RELATED APPLICATIONS

This application is based on and claims priority under 35 USC 119 from Japanese Patent Application No. 2014-019716 filed on Feb. 4, 2014.

BACKGROUND

Technical Field

The present invention relates to a data storage system that stores image data, an image processing device, a portable terminal, and a non-transitory computer readable medium.

SUMMARY

An aspect of the invention provides a data storage system comprising: an image processing device that processes an image; a server that receives image data from the image processing device and stores the image data; and a portable terminal that performs transmission and reception of data with the image processing device and the server, wherein the image processing device includes a storage unit that stores image data; a communication portion that performs communication with the server and the portable terminal; and an image processing function control portion that causes the communication portion to transmit the image data stored in the storage unit to the server and causes the communication portion to transmit the image data to the portable terminal in response to failure of transmission of the image data to the server by the communication portion, and wherein the portable terminal includes a receiving portion that receives the image data from the image processing device; and a storage unit that stores the received image data.

BRIEF DESCRIPTION OF THE DRAWINGS

Exemplary embodiment(s) of the present invention will be described in detail based on the following figures, wherein.

DETAILED DESCRIPTION

Hereinafter, embodiments of the invention are described in detail with reference to the drawings.

System Configuration

Figure 1:
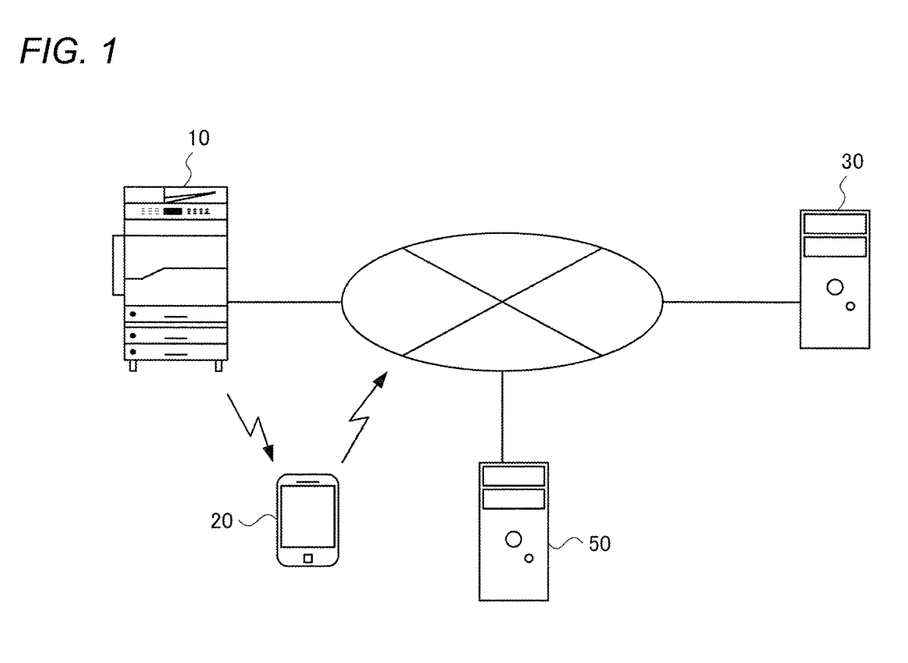
FIG. 1 is a diagram illustrating an example of an entire configuration of a data storage system to which an embodiment is applied.

FIG. 1 is a diagram illustrating an example of an entire configuration of a data storage system to which the embodiment is applied.

The data storage system according to the embodiment illustrated in FIG. 1 includes a multifunction printer (MFP) 10 that is a data acquiring unit, a portable information communication terminal (hereinafter, portable terminal) 20 that is a unit that temporarily stores acquired data, a storage server 30 that is a data storage unit, and a charging server 50 that performs a charge process.

Here, the multifunction printer 10 is an image processing device that performs functions of outputting an image, reading and transmitting image data, or the like. Moreover, for example, a multifunction printer installed in a circumstance such as a convenience store or a public facility is included which unspecified operators can use. The portable terminal 20 is a portable information processing apparatus with a communication function, and includes a so-called mobile communication apparatus such as a cellular phone or a smart phone. Specifically, as described below, the multifunction printer 10 and the portable terminal 20 each have a function of performing data exchange by short range radio communication.

Further, the storage server 30 is a storage server accessible through a computer network such as the Internet, and is realized as a so-called cloud server, or the like. The multifunction printer 10 and the storage server 30 are connected through a network (the Internet or the like) circuit. Further, the portable terminal 20 and the storage server 30 are connected through a circuit of a mobile communication system and a network circuit.

Further, the charging server 50 is a server accessible through a computer network such as the Internet. The portable terminal 20 and the charging server 50 are connected through the circuit of the mobile communication system and the network circuit.

Functional Configuration of Multifunction Printer

Figure 2:
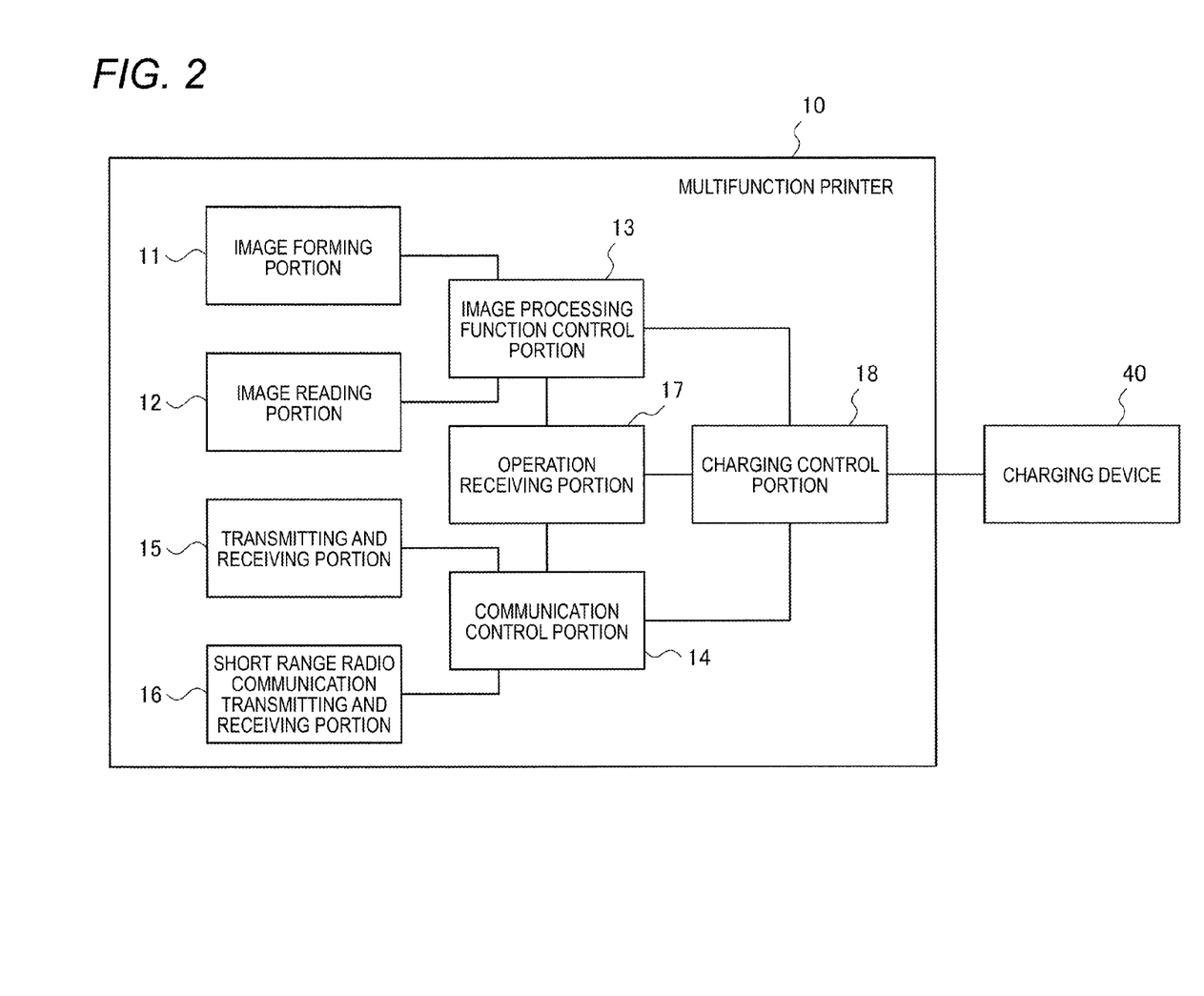
FIG. 2 is a diagram illustrating an example of a functional configuration of a multifunction printer used in the embodiment.

FIG. 2 is a diagram illustrating an example of a functional configuration of the multifunction printer 10 used in the embodiment.

As illustrated in FIG. 2, the multifunction printer 10 includes an image forming portion 11, an image reading portion 12, and an image processing function control portion 13. Further, the multifunction printer 10 includes a communication control portion 14, a transmitting and receiving portion 15, and a short range radio communication transmitting and receiving portion 16. In addition, the multifunction printer 10 includes an operation receiving portion 17 and a charging control portion 18.

The image forming portion 11 forms an image on a medium (paper) by using an image forming material based on digital data of an image (hereinafter, image data). As a method of forming an image, various kinds of methods according to the related art, such as an electrophotographic method using toner as an image forming material or an inkjet method using ink as an image forming material may be used.

The image data of the forming target may be received from an external device through the network, or may be data read by the image reading portion 12 as described below.

The image reading portion 12 is an image scanner that optically reads a document which is a read target, and converts the document as image data. The image reading portion 12 includes, for example, an illumination lamp that irradiates the document with light, a mirror that guides reflected light obtained from the document, an image forming lens that forms an image with the light guided by the mirror, and an image sensor that performs photoelectric conversion on an optical image formed by the image forming lens. The image sensor is, for example, a one-dimensional sensor using a charge coupled device (CCD) as an imaging element, and processes data of one line at a time. If the reading of one line in the line direction (main scanning direction of a scan) by the image sensor ends, the image reading portion 12 moves a relative position of an image sensor with respect to the document in a direction intersecting with the main scanning direction (sub-scanning direction), and reads the next line of the document. The document of one page is read by performing this throughout the entire document size.

The image processing function control portion 13 controls the image forming portion 11 or the image reading portion 12, and causes the image based on the image data to be formed, and causes the images of the document to be read. Further, the image processing function control portion 13 performs a process of developing (rasterizing) image data when the image forming process is performed by the image forming portion 11 or a process of converting a signal output from the image sensor into digital data when the image is read by the image reading portion 12.

The image processing function control portion 13 is realized by, for example, a central processing unit (CPU) which is an arithmetic unit, and a read only memory (ROM) and a random access memory (RAM) which are storage units. A control program for controlling the image forming portion 11 or the image reading portion 12, or a program for executing various kinds of image processes as described above are stored in the ROM. The CPU executes the controls and image processes as described above executing the programs. The RAM is used as a working memory when the CPU executes various kinds of processes.

Further, it is not specifically illustrated, a magnetic disk unit (Hard disk drive (HDD)) as an auxiliary storage device may be provided in the multifunction printer 10. The magnetic disk unit is used for storing, for example, the image data obtained as an image formation target by the image forming portion 11 or the image data read by the image reading portion 12. Further, the magnetic disk unit may be used for storing programs different from the program stored in the ROM.

The communication control portion 14 controls data communication with an external device with the various kinds of communication methods. Specifically, the communication control portion 14 controls data transmission and reception with the storage server 30 or the like performed through the computer network. Further, the communication control portion 14 controls data transmission and reception with the portable terminal 20 through short range radio communication. In addition, in a configuration in which a telephone circuit is connected to the multifunction printer 10, the communication control portion 14 may control facsimile transmission and reception performed by the telephone circuit. Detailed descriptions are provided below, but according to the embodiment, when the image data is desired to be transmitted to the storage server 30, but is not able to be transmitted, the image data is transmitted to the portable terminal 20. The communication control in this case also is performed by the communication control portion 14.

The communication control portion 14 is realized by, for example, the CPU which is an arithmetic unit and the ROM and the RAM which are storage units. A program for controlling data transmission and reception is stored in the ROM, and the CPU performs the communication control by executing the program. The RAM is used as a working memory or the like when the CPU performs a process in the communication control. Further, when a magnetic disk unit as the auxiliary storage device is provided in the multifunction printer 10, the magnetic disk unit is used in order to store transmitted data or received data from the communication control portion 14 in some cases.

The transmitting and receiving portion 15 is a network interface for connecting the multifunction printer 10 to the computer network. In addition, the connection to the computer network may be performed by wire or wirelessly. In the embodiment, the communication control portion 14 and the transmitting and receiving portion 15 function as a first communication portion for performing data exchange between the multifunction printer 10 and the storage server 30.

The short range radio communication transmitting and receiving portion 16 is a transmitting and receiving unit for a short range radio communication system such as near field communication (NFC), and controls data communication with an external device corresponding to the short range radio communication system by the same method or a compatible method. According to the embodiment, for example, the short range radio communication transmitting and receiving portion 16 corresponds to the data communication by the NFC and performs data exchange with the portable terminal 20 corresponding to the NFC in the same manner. Further, though it is not described in detail, according to the embodiment, when it is desired to transmit the image data to the storage server 30, but the image data is not transmitted, the image data is transmitted to the portable terminal 20. In this case, the transmission of the image data to the portable terminal 20 is performed by the short range radio communication system. Here, the data size of the image data is relatively great, but the communication speed of the NFC is relatively slow. Therefore, a transmitting and receiving portion that performs communication by NFC and a transmitting and receiving portion that performs communication by Bluetooth (registered trademark) are included as the short range radio communication transmitting and receiving portion 16, the authentication of the Bluetooth (pairing) is performed by NFC, and the transmission of the image data may be performed by Bluetooth having a communication speed faster than NFC. In this case, the portable terminal 20 is also required to correspond to both NFC and Bluetooth. According to the embodiment, the communication control portion 14 and the short range radio communication transmitting and receiving portion 16 function as a second communication portion for performing data exchange between the multifunction printer 10 and the portable terminal 20.

When NFC is used in the short range radio communication system, for example, a cradle and a holder on which the portable terminal 20 is mounted may be provided near the short range radio communication transmitting and receiving portion 16 in the housing of the multifunction printer 10. According to this, it is easy to dispose the portable terminal 20 at a place appropriate for the communication through the short range radio communication system. In addition, according to the embodiment, various kinds of systems can be applied as the short range radio communication system, and the short range radio communication system is not limited to NFC and Bluetooth. For example, infrared data communication by infrared data association (IrDA) may be used.

The operation receiving portion 17 receives input operations such as the setting of the various kinds of functions of the multifunction printer 10 and the execution instructions of processes based on the functions thereof. Specifically, the operation receiving portion 17 receives the execution instruction of an image forming process using the image forming portion 11 or an image read process using the image reading portion 12, the image data transmission instruction to the storage server 30, and the like. Further, according to the embodiment, the operation receiving portion 17 receives instructions for setting the image transmission or the charging, and the execution instruction of processes, which are performed when the transmission of the image data fails. Detailed descriptions of the instructions are described below.

The operation receiving portion 17 is realized by, for example, the combination of a display device of a liquid crystal display or the like and a touch panel. When an operation screen for performing various kinds of operations is displayed on the display device, and an operator of the multifunction printer 10 performs a touch operation according to the displayed operation screen, the operation is detected by the touch panel. Then, according to the content of the detected operation, commands and inputs of the data are received. As the detection method of the touch panel, various methods according to the related art such as the electrostatic capacitance method and the pressure sensitive method may be used, and the method is not particularly limited. Further, as the operation receiving portion 17, an operation button that can be associated with a specific function may be provided.

The charging control portion 18 controls a charging device 40 connected to the multifunction printer 10 as an external device, and collects charges (prices) with respect to the usage of the function of the multifunction printer 10. In addition, though the details are described below, according to the embodiment, when it is desired to transmit the image data to the storage server 30, but the image data is not transmitted, the image data is transmitted to the portable terminal 20. In this case, an operator of the multifunction printer 10 desires to use the function of transmitting the image data of the multifunction printer 10 to the storage server 30, but the function is not normally working. Therefore, the charge with respect to the transmission of the image data is stopped. Then, the information with respect to the charge (hereinafter, charge information) is transmitted to the portable terminal 20 together with the image data. Thereafter, in a condition in which the transmission to the storage server 30 of the image data is completed, the charge with respect to the transmission of the image data is performed by following units. The details of the charge control are described below.

Functional Configuration of Portable Terminal

Figure 3:
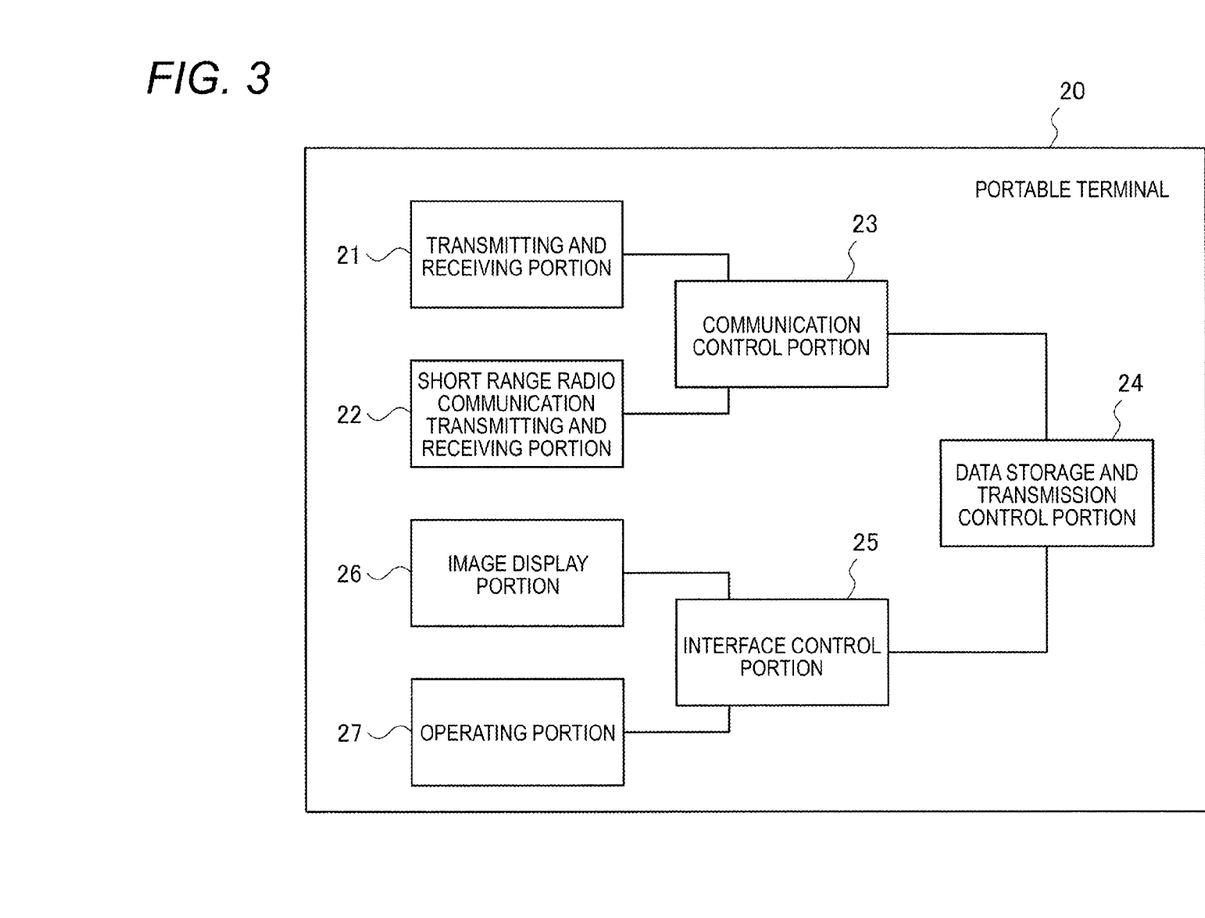
FIG. 3 is a diagram illustrating an example of a functional configuration of a portable terminal used in the embodiment.

FIG. 3 is a diagram illustrating an example of a functional configuration of the portable terminal 20 used in the embodiment.

As illustrated in FIG. 3, the portable terminal 20 includes a transmitting and receiving portion 21, a short range radio communication transmitting and receiving portion 22, and a communication control portion 23. Further, the portable terminal 20 includes a data storage and transmission control portion 24, an interface control portion 25, an image display portion 26, and an operating portion 27.

The transmitting and receiving portion 21 is a transmitting and receiving portion for connecting to the computer network through a data communication circuit of a mobile communication system. According to the embodiment, the transmitting and receiving portion 21 is used when the image data is transmitted from the portable terminal 20 to the storage server 30, and when an electronic mail transmitted from the multifunction printer 10 is received. Further, the transmitting and receiving portion 21 is also used when the information with respect to the charge is transmitted to the charging server 50.

The short range radio communication transmitting and receiving portion 22 is a transmitting and receiving portion for a short range radio communication system such as the NFC, and controls the data communication with the external device corresponding to the short range radio communication system by the same method or a compatible method. According to the embodiment, for example, the short range radio communication transmitting and receiving portion 22 corresponds data communication by NFC, and performs the data exchange with the multifunction printer 10 corresponding to the NFC in the same manner Specifically, in the embodiment, when the image data is transmitted from the multifunction printer 10 to the portable terminal 20, short range radio communication is used as the data transmission method. Here, the data size of the image data is relatively great, but the communication speed of NFC is relatively slow. Therefore, a transmitting and receiving portion that performs a communication by NFC and a transmitting and receiving portion that performs communication by Bluetooth are included as the short range radio communication transmitting and receiving portion 22, the authentication of the Bluetooth (pairing) is performed by NFC, and the transmission of the image data may be performed by Bluetooth having a communication speed faster than NFC. In this case, the multifunction printer 10 is also required to correspond to both NFC and Bluetooth.

In addition, according to the embodiment, as a short range radio communication system, various kinds of systems may be applied, and the short range radio communication system is not limited to NFC or Bluetooth. For example, infrared data communication by IrDA may be used.

The communication control portion 23 controls the data communication with the external device with the various kinds of communication methods. Specifically, the communication control portion 23 controls the data transmission and reception with the storage server 30 or the charging server 50 which are performed by using the transmitting and receiving portion 21 to be connected to a computer network through a data communication circuit of a mobile communication system. Further, the communication control portion 23 performs the data transmission and reception with the multifunction printer 10 or the like by short range radio communication. According to the embodiment, the transmitting and receiving portion 21 and the communication control portion 23 function as a transmitting portion for transmitting the image data to the storage server 30, and transmitting the charge information to the charging server 50. Further, the short range radio communication transmitting and receiving portion 22 and the communication control portion 23 function as a receiving portion for receiving image data from the multifunction printer 10.

The communication control portion 23 is realized by, for example, the CPU which is the arithmetic unit, and the ROM and the RAM which are storage units. The program for controlling the data transmission and reception is recorded in the ROM, and the CPU performs the communication control by executing the program. The RAM is used as a working memory when the CPU performs the process in the communication control.

The data storage and transmission control portion 24 controls the storage of the data acquired from the multifunction printer 10, and the transmission to the storage server 30. According to the embodiment, the portable terminal 20 acquires the image data from the multifunction printer 10 by short range radio communication. Then, the portable terminal 20 temporarily stores the acquired image data. Further, the portable terminal 20 transmits the image data acquired according to the predetermined setting, to the storage server 30.

Further, according to the embodiment, when the collection of the charges in the multifunction printer 10 is stopped, the charge information is transmitted from the multifunction printer 10 to the portable terminal 20 together with the image data. The data storage and transmission control portion 24 acquires and stores the charge information, and transmits the charge information to the charging server 50 in association with the transmission of the corresponding image data.

The data storage and transmission control portion 24 is realized by, for example, the CPU which is an arithmetic unit and the ROM and the RAM which are storage units. The program for controlling the data storage and transmission is recorded in the ROM, and the CPU performs the control of the data storage and transmission by executing the program. The RAM is used as a working memory when the CPU performs the process in the communication control. Further, the RAM is used as a storage unit for temporarily storing the image data and the charge information obtained from the multifunction printer 10. Further, the data storage and transmission control portion 24 may include a rewritable non-volatile memory as a storage unit for temporarily storing the image data and the charge information which are obtained from the multifunction printer 10.

The interface control portion 25 controls the image display portion 26 and the operating portion 27, and controls the provision of information to an operator of the portable terminal 20 and the reception of a command or data input by an operation of the operator, or the like. According to the embodiment, the interface control portion 25 displays an electronic mail obtained from the multifunction printer 10 on the image display portion 26. Further, the interface control portion 25 generates a reduced image based on the image data obtained from the multifunction printer 10, and displays the reduced image on the image display portion 26. Further, the interface control portion 25 receives an input of the transmission command of the image data and the charge information performed by the operator operating the operating portion 27. Further, the interface control portion 25 receives an input of the setting of the transmission method of the image data and the charge method performed by the operator operating the operating portion 27.

The interface control portion 25 is realized by, for example, the CPU which is an arithmetic unit and the ROM and the RAM which are storage units. A program for controlling the input and output of the data and the command by the image display portion 26 and the operating portion 27 is stored in the ROM, and the CPU performs the input and output control of the data and the command by executing the program. The RAM is used as a working memory or the like when the CPU performs a process in the communication control. Further, when the reduced image based on the image data obtained from the multifunction printer 10 is generated, the RAM is used as a storage unit for storing the reduced image.

The image display portion 26 is a unit for displaying information to the operator of the portable terminal 20, and is realized by, for example, a liquid crystal display. The reduced image generated based on the electronic mail obtained from the multifunction printer 10 and the image data obtained from the multifunction printer 10 is displayed on the image display portion 26 according to the embodiment. Further, an operation screen for receiving the operation with the operating portion 27 formed with the touch panel is displayed on the image display portion 26 according to the invention.

The operating portion 27 is realized by, for example, the touch panel installed to be overlapped with the image display portion 26. Then, the touch operation of the operator which is performed according to the operation screen displayed on the image display portion 26 is detected, and the command and the data input are received according to the operation content. As the detection method of the touch panel, various methods according to the related art such as the electrostatic capacitance method and the pressure sensitive method may be used, and the method is not particularly limited. Further, as the operating portion 27, in addition to the touch panel, an operation button that can be associated with a specific function may be provided.

Function of Storage Server and Charging Server

The storage server 30 is accessed by the multifunction printer 10 and the portable terminal 20 which is performed through the computer network. Then, the storage server 30 acquires the image data transmitted from the multifunction printer 10 and the image data transmitted from the portable terminal 20, and stores the image data in the storage unit such as a magnetic disk unit.

The charging server 50 is accessed by the portable terminal 20 performed through the computer network. Then, the charging server 50 performs a charge process with respect to the image data transmission to the storage server 30. Details of the conditions in which the charge process of the charging server 50 is generated and the details of the charge process are described below.

Operation of Transmission and Storage of Image Data: First Aspect

Subsequently, an operation relating to the transmission and the storage of the image data according to the embodiment is described.

Figure 4:
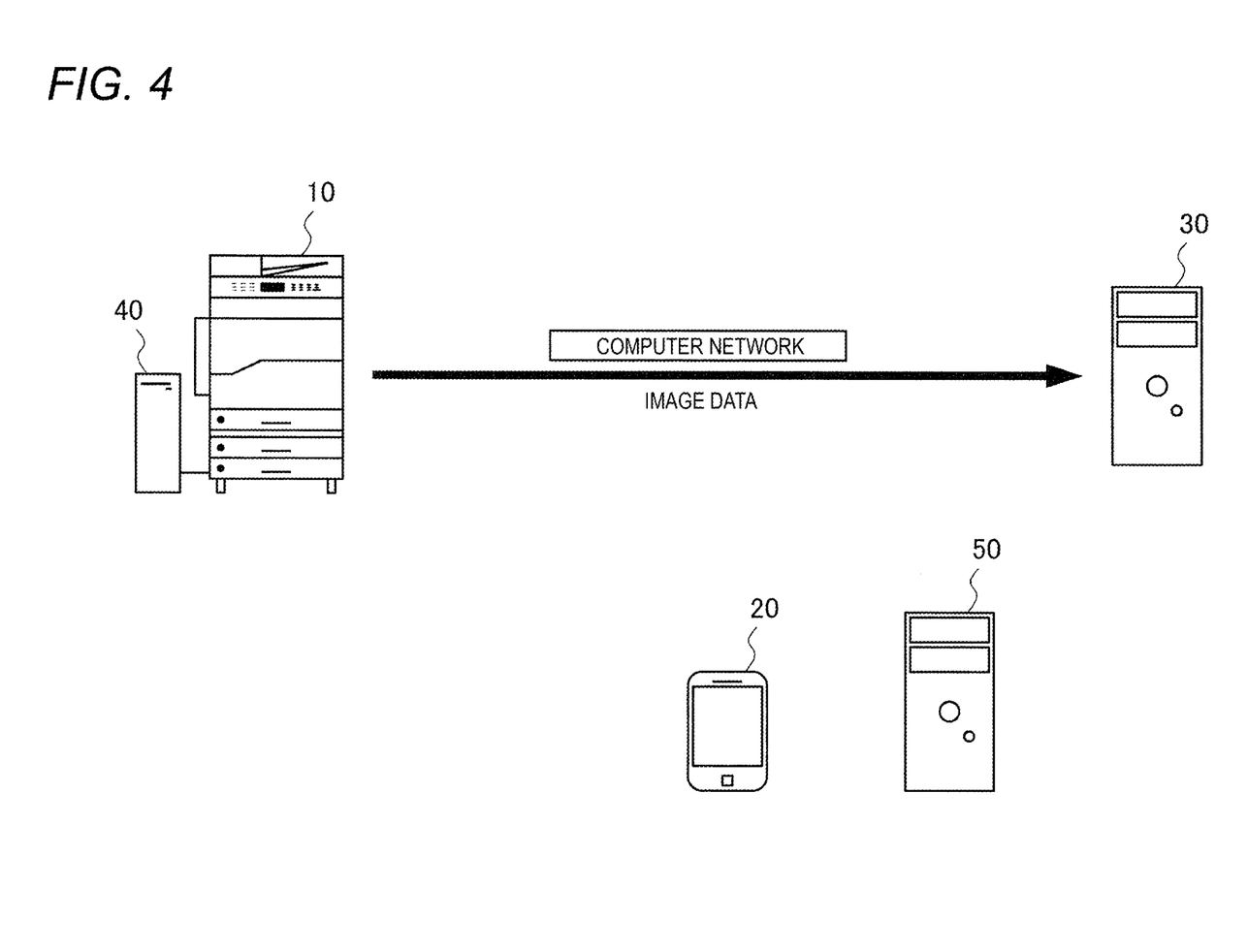
FIG. 4 is a diagram illustrating a first aspect of the transmission and storage operation according to the embodiment.

FIG. 4 is a diagram illustrating a first aspect of the transmission and storage operation according to the embodiment.

The first aspect illustrated in FIG. 4 indicates an operation when the transmission of the image data from the multifunction printer 10 to the storage server 30 is succeeded. The image data is acquired by, for example, a read process by the image reading portion 12 of the multifunction printer 10. The charging device 40 is connected to the multifunction printer 10, and the charging is performed before each process described below is performed.

According to the first aspect, the operator of the multifunction printer 10 selects an image reading function based on the operation screen displayed on the operation receiving portion 17 of the multifunction printer 10, and performs an input operation of the execution instruction of the read process. Accordingly, the image reading portion 12 of the multifunction printer 10 reads the image of the document which is the reading target. The image data obtained by the reading is stored in the storage unit of the multifunction printer 10 (the RAM or the magnetic disk unit of the image processing function control portion 13 or the like).

Subsequently, the operator selects a transmission function based on the operation screen displayed on the operation receiving portion 17, designates the storage server 30 as a transmission target, and performs an input operation of the transmission instruction of the image data. The designation of the transmission target is performed by designating, for example, an Internet protocol address (IP address) or a uniform resource locator (URL) of the storage server 30. Accordingly, the communication control portion 14 of the multifunction printer 10 transmits the image data to the storage server 30 designated as the transmission target by the transmitting and receiving portion 15.

In the processes described above, the charging is performed with respect to the read process by the image reading portion 12 and the transmission process by the communication control portion 14. When the charge is paid, the charging device 40 notifies information regarding the paid amount to the multifunction printer 10. If the paid amount is equal to or greater than the charge required for the execution of the process by the selected function, the multifunction printer 10 executes the process by the selected function.

Operation of Transmission and Storage of Image Data: Second Aspect

Figure 5:
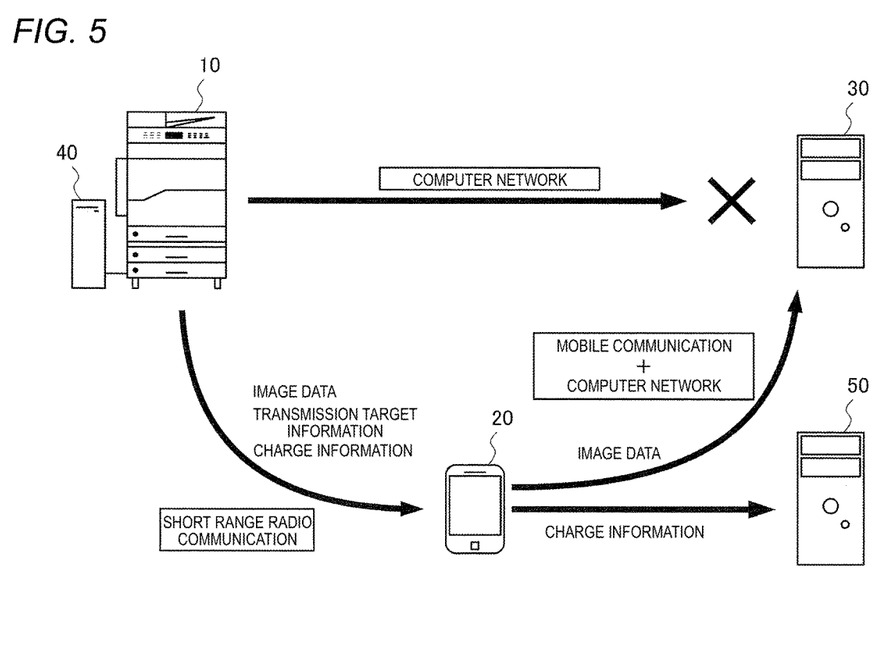
FIG. 5 is a diagram illustrating a second aspect of the transmission and storage operation according to the embodiment.

FIG. 5 is a diagram illustrating a second aspect of the transmission and storage operation according to the embodiment.

The second aspect illustrated in FIG. 5 indicates the operation when the transmission of the image data from the multifunction printer 10 to the storage server 30 fails. Causes of the failure of the transmission of the image data to the storage server 30 include an error in the storage server 30 itself, an error in a connection path from the multifunction printer 10 to the storage server 30, a malfunction of the transmitting and receiving portion 15 of the multifunction printer 10, and the like, but are not particularly limited thereto in the embodiment. The image data is obtained by, for example, the read process of the image reading portion 12 of the multifunction printer 10. The charging device 40 is connected to the multifunction printer 10, thus the charging is performed before each process described below is performed.

In the second aspect, the read process of the image and the transmission process of the image data are performed in the same manner as in the first aspect. However, the transmission process of the image data fails by some causes. In this case, generally, the retransmission process is performed by the communication control portion 14 of the multifunction printer 10 a predetermined number of times at a proper time interval. While the retransmission process is performed, the image data which is the transmission subject is maintained in the multifunction printer 10. Here, it is considered that the second aspect of the operation is performed not in a circumstance in which a limited number of operators can operate the multifunction printer 10 such as a workplace, but in a circumstance such as a convenience store or a public facility in which unspecified operators can operate the multifunction printer 10. Specifically, for example, in some cases, it is desired to acquire the image data by using the multifunction printer 10 installed in the convenience store at a place of visit, and store the image data in the storage server 30 on the Internet. In this circumstance, the operator may, in some cases, not stay at the place following the execution instruction of an image reading and transmitting process. Therefore, while the retransmission process of the image data in the multifunction printer 10 is continued, even if the operator who performs the transmission instruction is not at the place, the image data of the transmission subject remains in the multifunction printer 10.

According to the embodiment, in the circumstance as described above, the image data of the transmission subject can be deleted from the multifunction printer 10 by temporarily saving the image data of the transmission subject to the portable terminal 20.

That is, in the second aspect, when the transmission of the image data fails, the multifunction printer 10 displays a message indicating the failure on a display device of the operation receiving portion 17 and also displays an operation screen for causing the operator to select whether or not to save the image data in the portable terminal 20. If the operator selects to save the image data in the portable terminal 20 by operating the operation receiving portion 17 based on the operation screen, a message instructing the operator to place the portable terminal 20 on the cradle of the multifunction printer 10 is displayed on the display device of the operation receiving portion 17. If the operator places the portable terminal 20 on the cradle according to the message, the image data of the transmission subject is transmitted by using short range radio communication by the short range radio communication transmitting and receiving portion 16 of the multifunction printer 10 and the short range radio communication transmitting and receiving portion 22 of the portable terminal 20. At this point, the transmission target information (the IP address, the URL, or the like) of the transmission target (the storage server 30) of the image data is transmitted to the portable terminal 20 together with the image data.

If the image data of the transmission subject is transmitted (saved) from the multifunction printer 10 to the portable terminal 20, the multifunction printer 10 does not need to maintain the image data. Therefore, the image processing function control portion 13 deletes the image data. Accordingly, the image data of the transmission subject does not remain in the multifunction printer 10, and is temporarily stored in the portable terminal 20 carried by the operator himself or herself. Therefore, the operator does not have to leave the place at which the multifunction printer 10 is installed, while the image data of the transmission subject remains in the multifunction printer 10.

In the second aspect, the image data temporarily stored in the portable terminal 20 is transmitted from the portable terminal 20 to the storage server 30 based on the transmission target information transmitted together with the image data. That is, the communication control portion 23 of the portable terminal 20 uses the transmitting and receiving portion 21, accesses the storage server 30 through the data communication circuit of the mobile communication system and the computer network, and transmits the image data obtained from the multifunction printer 10. If the failure of the transmission of the image data from the multifunction printer 10 to the storage server 30 is caused by the error of the multifunction printer 10 or the connection path from the multifunction printer 10 to the storage server 30, the access from the portable terminal 20 to the storage server 30 can be performed. Therefore, in this case, the image data is transmitted from the portable terminal 20 to the storage server 30.

Meanwhile, if the failure of the transmission of the image data from the multifunction printer 10 to the storage server 30 is caused by the error of the storage server 30, the portable terminal 20 cannot be also accessed to the storage server 30. In this case, the portable terminal 20 tries access to the storage server 30 by repeating the transmission process of the image data at a proper time interval. In addition, the number of times and the time interval for repeating the transmission process of the image data are set by receiving the setting operation of the operator in a setting screen provided on the interface control portion 25 of the portable terminal 20.

However, in the second aspect, the read process of the image in the multifunction printer 10 is performed, but the transmission process of the image data is not completed. Accordingly, the charging is performed with respect to the read process of the image only. Specifically, the charging is stopped with respect to the transmission of the image data in a condition in which the operator selects to save the image data in the portable terminal 20 according to the operation of the operation receiving portion 17. Then, the charging in the charging device 40 is returned under the control of the charging control portion 18 of the multifunction printer 10.

Further, in this case, the charge information with respect to the transmission process of the image data is transmitted to the portable terminal 20 according to the transmission of the image data from the multifunction printer 10 to the portable terminal 20. Then, if the transmission of the image data from the portable terminal 20 to the storage server 30 is completed, the charge information from the portable terminal 20 to the charging server 50 is transmitted. The charging server 50 performs the charge process based on the received charge information, and collects the charge with respect to the transmission of the image data. As the method of collecting the charge, for example, an applicable method among the charge collecting methods in the related art which are realized with respect to the usage of a paid service using the portable terminal 20 such as a method by a credit card payment or a method of collecting the charge in addition to a connection fee of the mobile communication system may be applied.

In addition, in the operation of the second aspect, the transmission of the image data or the like from the multifunction printer 10 to the portable terminal 20 is performed by using short range radio communication by the short range radio communication transmitting and receiving portion 16 of the multifunction printer 10 and the short range radio communication transmitting and receiving portion 22 of the portable terminal 20. This may be configured to be able to transmit the image data from the multifunction printer 10 to the portable terminal 20 by other communication methods without using short range radio communication. For example, it is considered that the image data is attached to an electronic mail in which the transmission target information or the like is included, and is transmitted from the multifunction printer 10 to the portable terminal 20. Further, it is considered to transmit the image data from the multifunction printer 10 to a storage server which can be accessed through a computer network and which is different from the storage server 30, to store the image data in the storage server, and to transmit the storage destination information (the URL or the like) through the communication method such as electronic mail from the multifunction printer 10 to the portable terminal 20.

Figure 6:
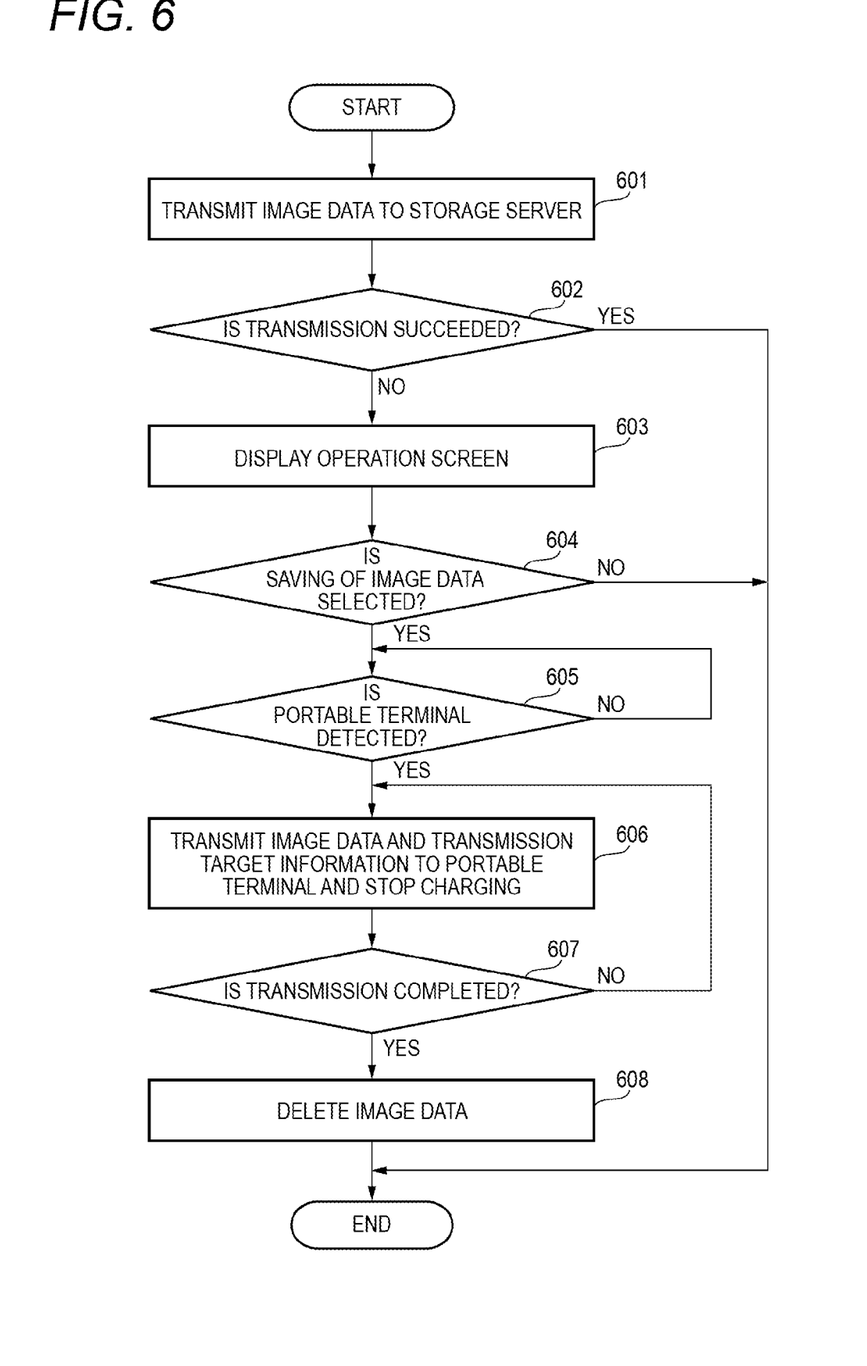
FIG. 6 is a flow chart illustrating an operation of the multifunction printer in the second aspect.

FIG. 6 is a flow chart illustrating an operation of the multifunction printer 10 in the second aspect.

As illustrated in FIG. 6, the multifunction printer 10 first performs a process of transmitting the acquired image data to the storage server 30 which is the original storage destination (Step 601). If the transmission is succeeded (Yes in Step 602), the process ends.

If the transmission of the image data from the multifunction printer 10 to the storage server 30 fails (No in Step 602), the multifunction printer 10 displays the operation screen for saving the image data on the display device of the operation receiving portion 17 (Step 603). If saving the image data is not selected on the operation screen, (No in Step 604), the process ends. Specifically, in the case of not selecting to save the image data, for example, a case in which the input operation of the instruction of stopping the storage of the image data is performed is considered.

When saving the image data is selected (Yes in Step 604), the multifunction printer 10 displays a message for instructing placing the portable terminal 20 on the cradle, and waits for the detection of the portable terminal 20 by the short range radio communication transmitting and receiving portion 16 (Step 605). If the portable terminal 20 is detected, the multifunction printer 10 transmits the image data and the transmission target information by short range radio communication to the portable terminal 20, and stops the charging with respect to the transmission of the image data (Step 606). If the transmission of the image data or the like is completed (Step 607), the multifunction printer 10 deletes the image data (Step 608).

Operation of Transmission and Storage of Image Data: Third Aspect

Figure 7:
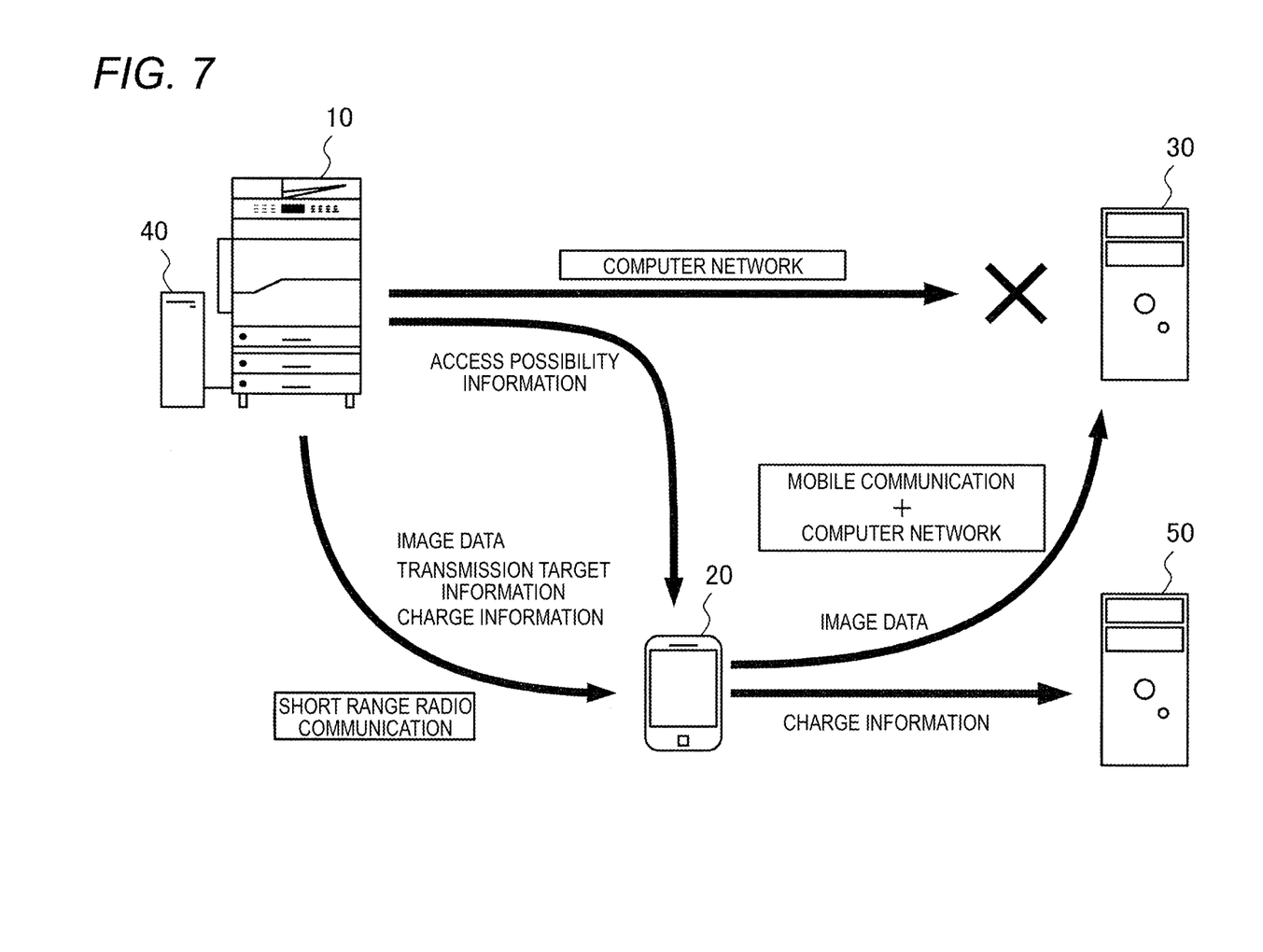
FIG. 7 is a diagram illustrating a third aspect of the transmission and storage operation according to the embodiment.

FIG. 7 is a diagram illustrating a third aspect of the transmission and storage operation according to the embodiment.

The third aspect illustrated in FIG. 7 indicates an operation when the transmission of the image data from the multifunction printer 10 to the storage server 30 fails. The operation performed when the transmission of the image data from the multifunction printer 10 to the storage server 30 fails until the image data is saved in the portable terminal 20 is the same as in the second aspect.

In the third aspect, after the image data is saved in the portable terminal 20, the multifunction printer 10 retries the access to the storage server 30 which is the transmission target of the image data at a predetermined proper interval. Then, if the access to the storage server 30 is succeeded, the information on the success (access possibility information) is notified to the portable terminal 20. The notification to the portable terminal 20 is performed by, for example, the electronic mail. Accordingly, in the third aspect, when the image data is stored in the portable terminal 20, the multifunction printer 10 deletes the image data from the storage unit, but the transmission target information required for the retry of the access is not deleted. Further, the multifunction printer 10 acquires the destination information (for example, an electronic mail address if the notification is performed by the electronic mail) of the portable terminal 20 required for notifying the success of the access to the transmission target to the portable terminal 20, and maintains the destination information together with the transmission target information of the image data (the storage server 30). The destination information of the portable terminal 20 may be transmitted from the portable terminal 20 to the multifunction printer 10 when the connection is performed by short range radio communication in order to transmit the image data to the portable terminal 20, or may be manually input by the operator of the multifunction printer 10 by the input operation using the operation receiving portion 17 of the multifunction printer 10.

If the notification of the access possibility information is performed by the electronic mail, the portable terminal 20 receives the notification according to the electronic mail with the transmitting and receiving portion 21 and the communication control portion 23. Accordingly, in this case, the transmitting and receiving portion 21 and the communication control portion 23 function as an access possibility information receiving portion for receiving access possibility information by the electronic mail from the multifunction printer 10.

If the notification from the multifunction printer 10 is received, the operator of the portable terminal 20 recognizes that the access to the storage server 30 is possible. Therefore, the access from the portable terminal 20 to the storage server 30 is performed, and the temporarily stored image data is transmitted. At this point, the charge information from the portable terminal 20 to the charging server 50 is transmitted. The operations of transmitting the image data to the storage server 30 and transmitting the charge information to the charging server 50 are the same as in the second aspect.

Figure 8:
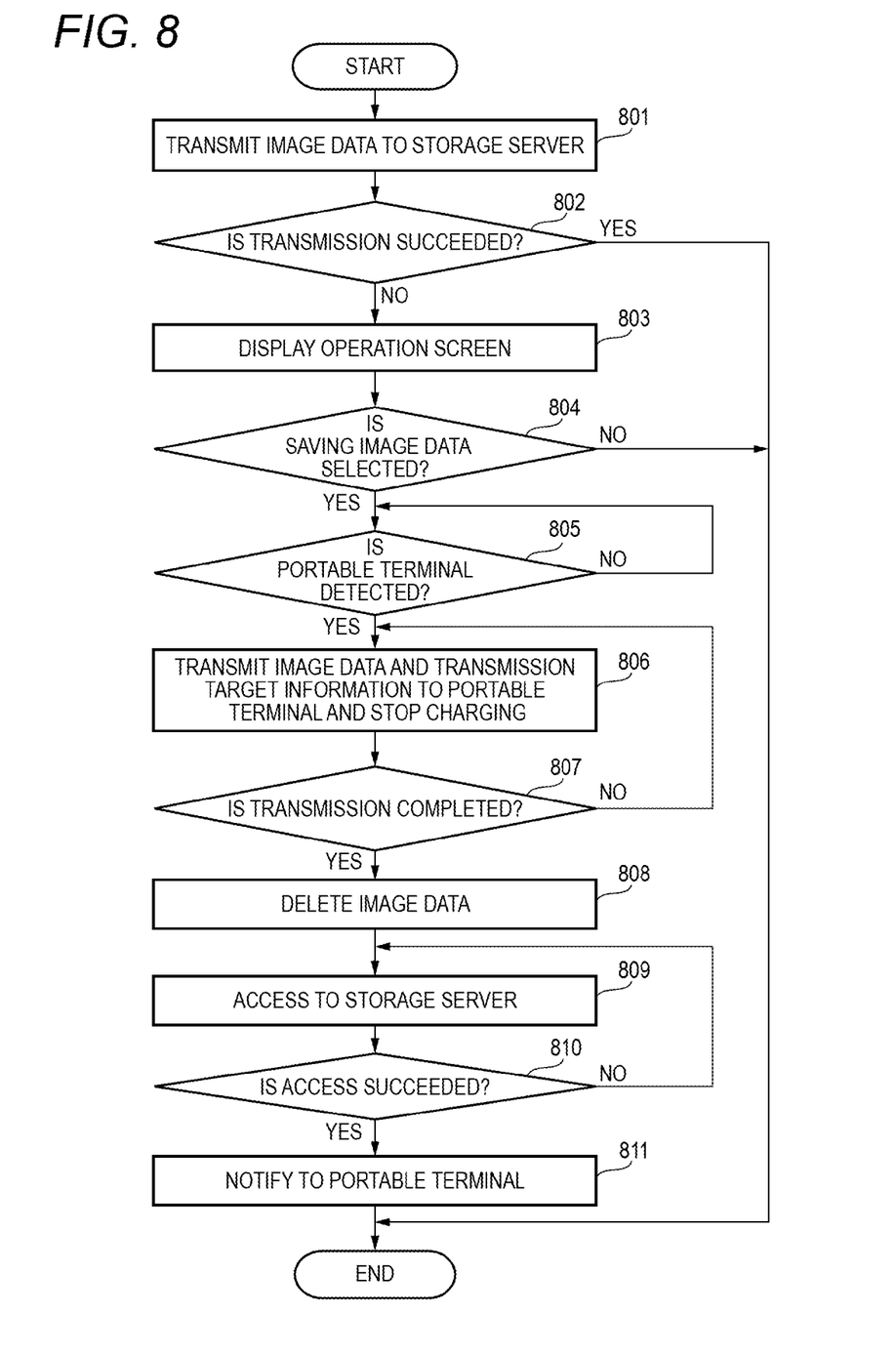
FIG. 8 is a flow chart illustrating the operation of the multifunction printer according to the third aspect.

FIG. 8 is a flow chart illustrating the operation of the multifunction printer 10 according to the third aspect.

In the operations of the multifunction printer 10 illustrated in FIG. 8, since the operations of Steps 801 to 808 are the same as the operations of Steps 601 to 608 in the second aspect of the multifunction printer 10 in FIG. 6, the detailed descriptions thereof are omitted.

After the transmission of the image data from the multifunction printer 10 to the portable terminal 20 is completed and the image data is deleted from the multifunction printer 10 (Steps 807 and 808), the multifunction printer 10 repeats the access to the storage server 30 according to the setting (Steps 809 and 810). Then, if the access to the storage server 30 is succeeded, the multifunction printer 10 notifies the access possibility information to the portable terminal 20 (Step 811). In addition, though it is not indicated in FIG. 8, the access to the storage server 30 by the multifunction printer 10 indicated in Steps 809 and 810 may end after being repeated according to the setting condition. As the setting condition, the number of times of performing the access attempt (for example, if the access attempt is repeated and is not succeeded within 10 times, the access attempt ends), the period of performing the access attempt (for example, if the access attempt is repeated and is not succeeded within 30 minutes, the access attempt ends), and the like are considered.

Operation of Transmission and Storage of Image Data: Fourth Aspect

Figure 9:
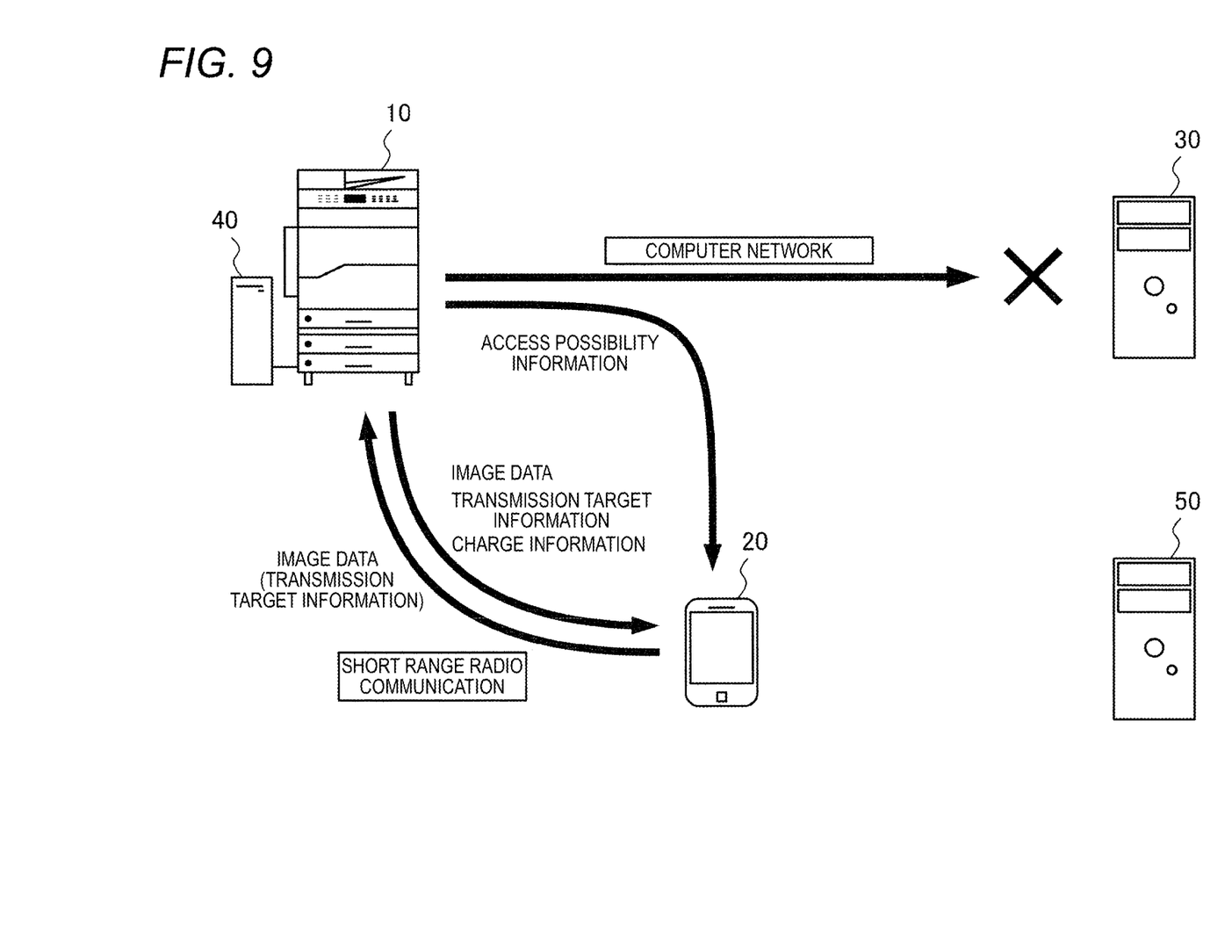
FIG. 9 is a diagram illustrating a fourth aspect of the transmission and storage operation according to the embodiment.

FIG. 9 is a diagram illustrating a fourth aspect of the transmission and storage operation according to the embodiment.

The fourth aspect illustrated in FIG. 9 indicates the operation when the transmission of the image data from the multifunction printer 10 to the storage server 30 fails. The operation performed when the transmission of the image data from the multifunction printer 10 to the storage server 30 fails until the image data is saved in the portable terminal 20 is the same as in the second aspect.

In the fourth aspect, after the image data of the transmission subject is saved from the multifunction printer 10 to the portable terminal 20, the image data is returned from the portable terminal 20 to the multifunction printer 10, and the image data is transmitted from the multifunction printer 10 to the storage server 30. Here, the timing for returning the image data from the portable terminal 20 to the multifunction printer 10 may be the time after a proper time has elapsed or the time after the notification from the multifunction printer 10 described in the third aspect is performed, according to the discretion of the operator of the portable terminal 20. Further, the multifunction printer 10 which is the target of transmitting the image data from the portable terminal 20 does not have to be the same multifunction printer 10 as the one that has transmitted the image data to the portable terminal 20. That is, it may be a different multifunction printer 10 disposed at a different position from the multifunction printer 10 that has transmitted the image data to the portable terminal 20.

In the fourth aspect, the operator of the multifunction printer 10 and the portable terminal 20 first selects the function of transmitting the image from the portable terminal 20 to the multifunction printer 10 based on the operation screen displayed on the operation receiving portion 17 of the multifunction printer 10. Then, the portable terminal 20 is positioned on the cradle of the multifunction printer 10. Accordingly, the image data of the transmission subject is transmitted from the portable terminal 20 to the multifunction printer 10 through short range radio communication by the short range radio communication transmitting and receiving portion 16 of the multifunction printer 10 and the short range radio communication transmitting and receiving portion 22 of the portable terminal 20. Accordingly, in this case, the short range radio communication transmitting and receiving portion 22 and the communication control portion 23 function as the image data transmitting portion for transmitting the image data to the multifunction printer 10. The image data obtained from the portable terminal 20 is stored in the storage unit of the multifunction printer 10 (the RAM or the magnetic disk portion of the image processing function control portion 13 or the like).

Subsequently, the operator of the multifunction printer 10 selects the transmission function based on the operation screen displayed on the operation receiving portion 17, and performs the input operation of the transmission instruction of the image data. The transmission target information of the image data may be transmitted from the portable terminal 20 to the multifunction printer 10 together with the image data when the image data is transmitted from the portable terminal 20 to the multifunction printer 10, and may be manually input by the operator of the multifunction printer 10 by the input operation by using the operation receiving portion 17 of the multifunction printer 10. Further, if the transmission target information used for retrying the access to the storage server 30 by the multifunction printer 10 is maintained, and the transmission target information may be used in association with the image data of the transmission subject. Accordingly, the communication control portion 14 of the multifunction printer 10 transmits the image data to the storage server 30 designated as the transmission target by the transmitting and receiving portion 15.

In the fourth aspect, the transmission of the image data to the storage server 30 is performed by using the function of the multifunction printer 10. Accordingly, the charge with respect to the transmission of the image data is performed by using the charging device 40 in the multifunction printer 10 that has transmitted the image data. That is, the operator pays the usage charge of the transmission function of the data in the charging device 40 and the transmission process of the image data by the function is performed.

In the above, the representative four aspects (the first to fourth aspects) according to the embodiment are described, but these may be appropriately combined in the actual operation. For example, after the notification from the multifunction printer 10 to the portable terminal 20 which is described in the third aspect is performed, the operator may select whether to transmit the image data from the portable terminal 20 to the storage server 30, or to transmit the image data to the multifunction printer 10 and to transmit the image data from the multifunction printer 10 to the storage server 30.

Further, as the image data acquiring method, an embodiment of acquiring the image data by using the image reading portion 12 included in the multifunction printer 10 is described, but the method is not limited thereto. For example, a case in which the image data is acquired by a camera included in the portable terminal 20, and is transmitted to the multifunction printer 10, a case in which the image data stored in the information processing apparatus such as a PC is transmitted to the multifunction printer 10, or the like may be considered. In addition, when the image data is transmitted to the storage server 30, information indicating the transmission source may be transmitted in a combined manner Accordingly, a service provider having the storage server 30 may identify the transmission source of the image data is the multifunction printer 10 or the portable terminal 20.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A data storage system comprising:
an image processing device configured to process an image;
a server configured to receive image data from the image processing device and store the image data; an
a portable terminal configured to perform transmission and reception of data with the image processing device and the server,
wherein the image processing device includes:
a storage unit configured to store image data;
a communication portion configured to perform communication with the server and perform short range radio communication with the portable terminal; and
an image processing function control portion configured to cause the communication portion to transmit the image data stored in the storage unit to the server; and
an instructing unit configured to instruct to perform short range radio communication with the portable terminal in response to a failure of transmission of the image data to the server by the communication portion,
wherein the image processing function control portion is further configured to cause the communication portion to transmit the image data and a transmission destination address for transmitting the image data to the server to the portable terminal when transmission of the image data to the server by the communication portion fails and the portable terminal is detected within a range to perform short range radio communication, and
wherein the portable terminal includes:
a receiving portion configured to receive the image data from the image processing device; and
a storage unit configured to store the received image data.

2. The data storage system according to claim 1,
wherein the image processing function control portion of the image processing device is configured to delete the image data from the storage unit of the image processing device after the image data is transmitted to the portable terminal by the communication portion.

3. The data storage system according to claim 1,
wherein the receiving portion of the portable terminal is configured to receive from the image processing device, the transmission destination address for transmitting the image data to the server together with the image data, and
the portable terminal further includes a transmitting portion configured to transmit the image data stored in the storage unit of the portable terminal to the server based on the transmission destination address received by the receiving portion.

4. The data storage system according to claim 3,
wherein the communication portion of the image processing device is configured to perform an access attempt to the server at a time interval after the failure of the transmission of the image data to the server, and the image data is deleted from the storage unit of the image processing device by the image processing function control portion, and to transmit access possibility information to the portable terminal in response to the access to the server becoming possible,
the portable terminal further includes an access possibility information receiving portion configured to that receive the access possibility information transmitted from the image processing device, and
the transmitting portion of the portable terminal is configured to transmit the image data to the server in response to the access possibility information being received by the access possibility information receiving portion.

5. The data storage system according to claim 3,
wherein the communication portion of the image processing device is configured to perform access attempt to the server at a time interval after the failure of the transmission of the image data to the server, and the image data is deleted from the storage unit of the image processing device by the image processing function control portion, and to transmit access possibility information to the portable terminal in response to the access to the server becoming possible, and
the portable terminal further includes an access possibility information receiving portion configured to receive the access possibility information transmitted from the image processing device.

6. The data storage system according to claim 3, further comprising:
a charging device configured to receive a charge with respect to a process by the image processing device, and stop the reception of the charge with respect to a transmitting process of the image data to the server in response to the failure of the transmission of the image data to the server by the communication portion,
wherein the communication portion of the image processing device is configured to transmit to the portable terminal, the image data together with charge information relating to the charge with respect to the transmitting process of the image data to the server, and
the communication portion of the image processing device is configured to perform a charge process based on the charge information in response to the image data being transmitted to the server by the transmitting portion of the portable terminal.

7. The data storage system according to claim 1,
wherein the image processing device further comprises a display device, and
the requesting portion is configured to cause as the request, the display device to display a message indicating the failure of transmission of the image data to the server by the communication portion.

8. An image processing device comprising:
a storage unit configured to store image data;
a communication portion configured to perform communication with a server and perform short range radio communication with a portable terminal; and
an image processing function control portion configured to cause the communication portion to transmit the image data stored in the storage unit to the server; and
an instructing unit configured to instruct to perform short range radio communication with the portable terminal in response to a failure of transmission of the image data to the server by the communication portion,
wherein the image processing function control portion is further configured to cause the communication portion to transmit the image data and a transmission destination address for transmitting the image data to the server to the portable terminal when the transmission of the image data to the server by the communication portion fails and the portable terminal is detected within a range to perform short range radio communication.

9. The image processing device according to claim 8, wherein the image processing function control portion is further configured to delete the image data from the storage unit after the image data is transmitted to the portable terminal by the communication portion.

10. The image processing device according to claim 9, wherein in response to the image data being acquired from the portable terminal by the communication portion after the failure of the transmission of the image data to the server and the deletion of the image data from the storage unit by the image processing function control portion, the communication portion is configured to transmit the acquired image data to the server based on the transmission destination address stored in the storage unit.

11. The image processing device according to claim 8, further comprising:
a charging control portion configured to receive a charge with respect to a process relating to image data and stop reception of a charge with respect to a transmitting process of the image data to the server in response to the failure of the transmission of the image data to the server by the communication portion.

12. The image processing device according to claim 8, further comprising:
a display device,
wherein the requesting portion is configured to cause as the request, the display device to display a message indicating the failure of transmission of the image data to the server by the communication portion.

13. A non-transitory computer readable medium storing a program causing a portable terminal to execute a process for controlling image data, in which the portable terminal includes a first transmitting and receiving portion that performs transmission and reception of data through a data communication line of a mobile communication system, and a second transmitting and receiving portion that performs transmission and reception of the data through short range radio communication, the process comprising:
causing the second transmitting and receiving portion to receive image data and transmission destination address for transmitting the image data to the server from an image processing device that reads an image, acquires the image data, and transmits the image data to the server, the image processing device performing transmission and reception of data through the short range radio communication in response to a failure of transmission of the image data to the server; and
causing the first transmitting and receiving portion to transmit the image data to the server based on the transmission destination address.

* * * * *